(12) United States Patent
Nicholson

(10) Patent No.: US 6,803,758 B1
(45) Date of Patent: Oct. 12, 2004

(54) NON-CONTACT MAGNETICALLY VARIABLE DIFFERENTIAL TRANSFORMER

(75) Inventor: Warren Baxter Nicholson, El Paso, TX (US)

(73) Assignee: Delphi Technologies, Inc., Troy, MI (US)

(*) Notice: Subject to any disclaimer, the term of this patent is extended or adjusted under 35 U.S.C. 154(b) by 28 days.

(21) Appl. No.: 10/423,151

(22) Filed: Apr. 25, 2003

(51) Int. Cl.⁷ .............................. H01F 5/00; G01B 7/30; G01B 7/14
(52) U.S. Cl. .................. 324/207.18; 336/115; 336/117; 324/207.16
(58) Field of Search ...................... 324/207.16, 207.18; 336/110, 115, 117, 126

(56) References Cited

U.S. PATENT DOCUMENTS

| | | | |
|---|---|---|---|
| 3,546,648 A | 12/1970 | Chass | 336/136 |
| 4,808,958 A | 2/1989 | Hewitt et al. | 324/207.18 |
| 6,311,566 B1 * | 11/2001 | Ferguson | 73/802 |
| 6,362,586 B1 | 3/2002 | Naidu | |
| 6,404,184 B1 * | 6/2002 | Tabrizi | 324/207.18 |
| 6,489,760 B2 | 12/2002 | Kim et al. | 324/207.18 |
| 6,605,940 B1 * | 8/2003 | Tabrizi et al. | 324/207.18 |
| 6,629,650 B2 | 10/2003 | Curran et al. | |
| 2002/0180427 A1 | 12/2002 | Schroeder et al. | 324/207.24 |

* cited by examiner

Primary Examiner—Anh Mai
(74) Attorney, Agent, or Firm—Jimmy L. Funke

(57) ABSTRACT

A magnetically variable differential transformer, comprising: a primary winding; a first secondary winding; a second secondary winding; a non-movable permeable core disposed within the primary winding, the first secondary winding and the second secondary winding; and a movable magnet configured for movement about the primary winding, the first secondary winding and the second secondary winding, wherein movement of the movable magnet causes magnetic saturation of portions of the non-movable permeable core.

25 Claims, 4 Drawing Sheets

NON-CONTACT MAGNETICALLY VARIABLE DIFFERENTIAL TRANSFORMER

TECHNICAL FIELD

The present disclosure relates to a variable differential transformer for measuring the movement of an object.

BACKGROUND

The linear variable differential transformer (LVDT) is one of the oldest electronic methods known to accurately measure the linear displacement of a body. The LVDT is a differential transformer which consists of a primary winding and two secondary windings and a movable coupling core.

As shown in FIGS. 1–3 a LVDT device 10 of the prior art (e.g., movable coupling core) is shown. Here LVDT device 10 comprises a primary winding 12, a first secondary winding 14, a second secondary winding 16 and a movable core 18. As is known in the related arts the core is connected to a sine wave excitation source for inducing voltages in the secondary windings.

When the movable core is at a center point of travel (FIG. 1) the core equally overlaps the two secondary windings, which results in equal voltages being induced in the secondary windings. The two secondary windings are connected in such a way that the two voltages are opposite in phase and cancel each other out resulting in a zero output. This is illustrated schematically in graph 20.

As the core moves to the maximum point of travel in one direction (FIG. 2) the induced voltage reaches a maximum with a phase illustrated in graph 22. This is because the core, which is of a high permeability material couples more magnetic flux into secondary winding 14 and very little into secondary winding 16. The difference between secondary winding 14 and secondary winding 16 results in a maximum amplitude and phase graph 22, which is similar to the excitation. Positions of the core between the center of travel illustrated in FIG. 1 and the maximum illustrated in FIG. 2 will have a lower amplitude but similar phase.

As the core moves to the position illustrated in FIG. 3. the amplitude of the induced voltage reaches a maximum (graph 24), with a phase that is 180 degrees opposite to the phase of graph 22. FIG. 4 schematically illustrates a LVDT 10. As illustrated in FIG. 4, the windings and the movable core are housed with a structure and movement of the movable core is facilitated by an actuating member 28 that is secured to the movable core at one end and the item whose movement is to be tracked or sensed at the other end. In order to allow for movement of the movable core the actuating member must pass through a sealing device or bearing that allows for movement of the actuating member while protecting the interior of the LVDT from contamination, such as moisture or salt or other contaminants which may affect performance of the LVDT.

Examples of such LVDTs are disclosed in U.S. Pat. Nos. 3,546,648 and 4,808,958 the contents of which are incorporated herein by reference thereto.

There are two shortcomings of the LVDTs of the prior art that are overcome by the present disclosure. First, the length of the LVDT device is twice the designed length of travel since the actuating member must have a length outside of the housing that is long enough to provide the movement illustrated in FIGS. 1–3 (e.g., movement of the core within the housing). And secondly, the actuating member or rod, which is secured to the movable core and the body to be measured, must pass through the housing of the LVDT which means a sealing means is required.

In vehicular applications these two problems are exacerbated as real estate for such devices is typically at a premium and sealing means which are subject to constant movement may curtail the life expectancy of such a device.

SUMMARY

A magnetically variable differential transformer, comprising: a primary winding; a first secondary winding; a second secondary winding; a non-movable permeable core disposed within the primary winding, the first secondary winding and the second secondary winding; and a movable magnet configured for movement about the primary winding, the first secondary winding and the second secondary winding, wherein movement of the movable magnet causes magnetic saturation of portions of the non-movable permeable core.

A magnetically variable differential transformer, comprising: a primary winding disposed on a center portion of a bobbin having a central opening, the bobbin being formed out of a non-magnetic material; a first secondary winding disposed on one side of the bobbin adjacent to the primary winding; a second secondary winding disposed on another side of the bobbin adjacent to the primary winding; a non-movable permeable core being disposed in the central opening and being disposed within the first secondary winding, the primary winding and the second secondary winding; and a movable magnet disposed about the primary winding, the first secondary winding and the second secondary winding, wherein movement of the movable magnet causes magnetic saturation of portions of the non-movable permeable core.

A magnetically variable differential transformer, comprising: a primary winding disposed about a center portion of a non-movable permeable core; a first secondary winding disposed on one side of the primary winding and being disposed about a first portion of the non-movable permeable core; a second secondary winding disposed on another side of the primary winding and being disposed about a second portion of the non-movable permeable core; and a movable magnet being configured to magnetically saturate one of the first portion, the second portion or the center portion of the non-movable permeable core as the movable magnet moves with respect to the non-movable permeable core.

A method for tracking the movement of a movable object with a variable differential transformer, comprising: providing an excitation to a primary winding disposed between a first secondary winding and a second secondary winding, the primary winding, the first secondary winding and the second secondary winding are each disposed about a non-moveable permeable core, wherein the first secondary winding and the second secondary winding are connected to each other and provide an output corresponding to voltages induced within the first secondary winding and the second secondary winding by the primary winding; and coupling a movable magnet to the movable object wherein the movable magnet saturates portions of the non-moveable permeable core thereby modifying the output corresponding to voltages induced within the first secondary winding and the second secondary winding by the primary winding.

BRIEF DESCRIPTION OF THE DRAWINGS

The present disclosure will now be described, by way of example, with reference to the accompanying drawings, in which.

DESCRIPTION OF THE EMBODIMENTS

Disclosed herein is a non-contact magnetically variable differential transformer (MVDT) wherein a movable magnet is disposed about the housing of the MVDT and the core of the MVDT is stationary. Movement of the magnet will change the induced voltages in the secondary windings. Thus, the need for a sealing means is negated as there is no requirement for an actuating member to move the core. Also the length of the device is reduced as the body whose movement is to be monitored is mechanically connected to the movable magnet is direction which allows the required space for the MVDT to be reduced.

Figure 5:
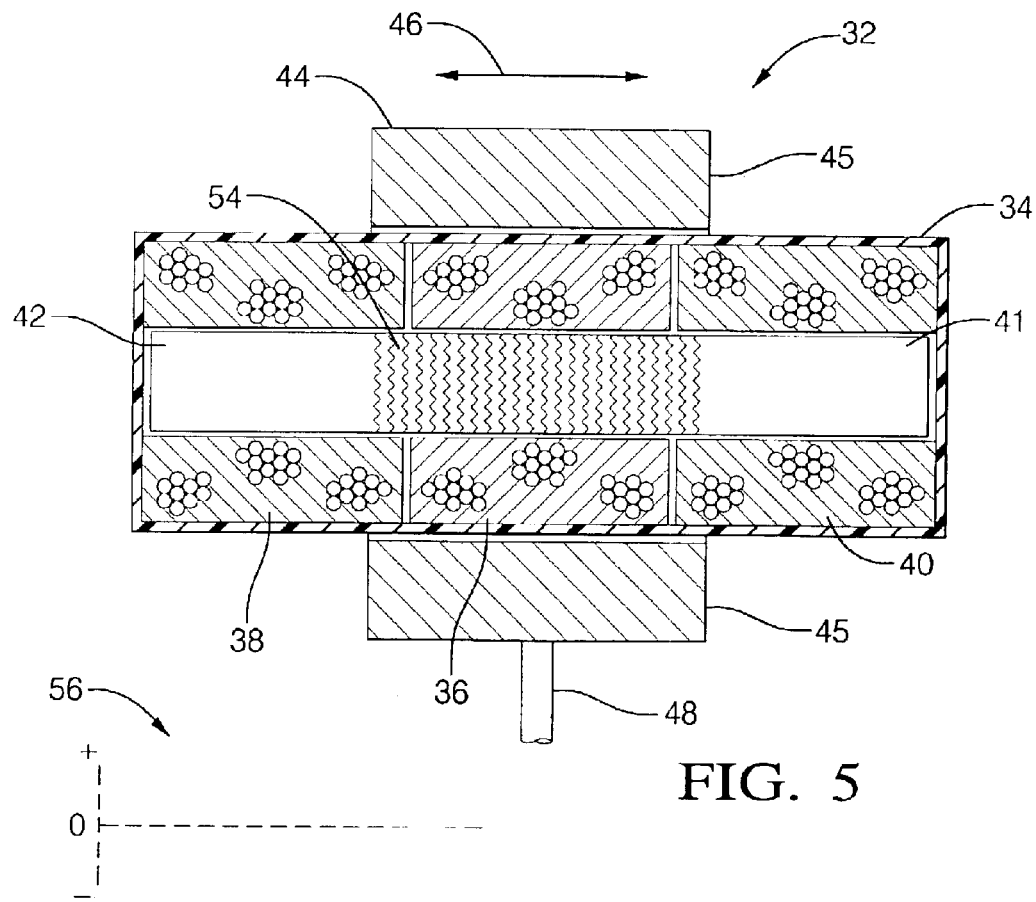
FIG. 5 is a cross-sectional view of a magnetically variable differential transformer (MVDT) of the present disclosure in a first position or center of travel.

Referring now to FIG. 5, a non-contact magnetically variable differential transformer (MVDT) 32 of the present disclosure is illustrated. Here MVDT 32 comprises a non magnetic housing 34 which is configured to encase a primary winding 36, a first secondary winding 38 and a second secondary winding 40 disposed about a non-movable core 42, which extends through the entire length between primary winding 36 and first secondary winding 38 and second secondary winding 40 which are disposed on either side of the primary winding. In other words the non-movable core may be referred to as comprising three portions, a center portion disposed within primary winding 36, a first end portion disposed within first secondary winding on one side of the center portion and a second end portion disposed within second secondary winding at the other side of the center portion.

In an exemplary embodiment, the non-movable core is high permeable material such as ferrite or steel or equivalents thereof that is easily magnetically saturated. Therefore the core will lose it high permeability when it is magnetically saturated by a magnet, which in essence converts it from a material that efficiently transfers flux to a material that has permeability characteristics similar to air.

In accordance with an exemplary embodiment the core is not movable and extends completely through the windings or completely through an opening of a bobbin 41 upon which the windings are placed. The bobbin and the housing comprise a non-magnetic material such as plastic, which is also easily molded into a preferred configuration. In addition, and in order to assist with the placement of the windings on the bobbin the bobbin is configured to have partitions which separate the area for the primary winding from the areas for the secondary windings. The bobbin may also comprise end portions, which are located at the center of the bobbin. Of course, the bobbin may be configured without end portions and partitions. Once the windings are in place and the non-movable core is disposed therein, the entire assembly is sealed within housing 34 thereby providing a moisture or contaminant resistant housing. The only items that leave housing 34 are the terminations for the windings to provide the excitation and measure the induced voltages.

Disposed about the housing of MVDT 32 is a movable permanent magnet 44, which is configured to pass magnetic flux into the core as it is moved with respect to the housing and saturate local areas of the core as it is moved with respect to the core. Movement of the movable magnet in the directions indicated by arrows 46 is facilitated by a mechanical connection 48 between movable magnet 44 and a body 50 (illustrated schematically) whose movement is to be tracked.

In an exemplary embodiment movable magnet comprises two magnets 45 each having the appropriate pole configuration to saturate the portions of the core disposed within the area between the magnets. In this embodiment, the two magnets are encased in a ring of plastic wherein the ring is configured to be disposed about housing 34 and allow housing 34 to move within movable magnet 44. In other words, the ring is configured to move along the length of the housing in a non-contacting manner. The ring of plastic is then secured to connection 48 or alternatively connection 48 may be integrally molded with the ring of plastic having the magnets sealed therein.

Of course, other configurations are contemplated to be within the scope of the present disclosure. For example, a ring magnet may be used or a plurality of ring magnets may be used. In essence and in accordance with an exemplary embodiment the movable magnet comprises an item capable of magnetically saturating relevant portions of the core material while also being connected to a movable member whose movement is to be tracked. This connection is facilitated in a manner which allows the overall length of the MVDT to be reduced, as compared to an LVDT.

As illustrated in FIG. 5 mechanical connection 48 depends away from housing 34 in the direction of arrow 52. This allows MVDT 32 to be positioned adjacent to or in a parallel relationship with regard to the body whose movement is to be tracked. This in turn allows the overall length of MVDT 32 to be shorter than the LVDT of the prior art, as the latter requires a length of an actuating member at least as long, if not longer, to depend away from one end of the device. The reduced size of the MVDT is particularly useful in vehicular applications wherein high resolution sensitivity is required and there is very little space for moving parts. An example of such an application is a "steer by wire" sensor. Of course, many other uses are contemplated to be within the scope of the present disclosure.

Of course, it is contemplated that the angular configurations of mechanical connection 48 with respect to magnet 44 and/or body 50 may vary to configurations other than those shown in FIG. 5. Also, and since movable magnet 44 is disposed outside the housing of MVDT 32, there is no need for a sealing means at the end of the device. Thus, the device can be hermetically sealed.

FIG. 5 illustrates the movable magnet of MVDT 32 at a center point of travel with respect to the core of the MVDT. At this point, the position of the movable magnet induces lines of flux 54 to pass through the core, which magnetically saturates the central portion of the core thereby results in equal voltages being induced in the secondary windings.

Figure 3:
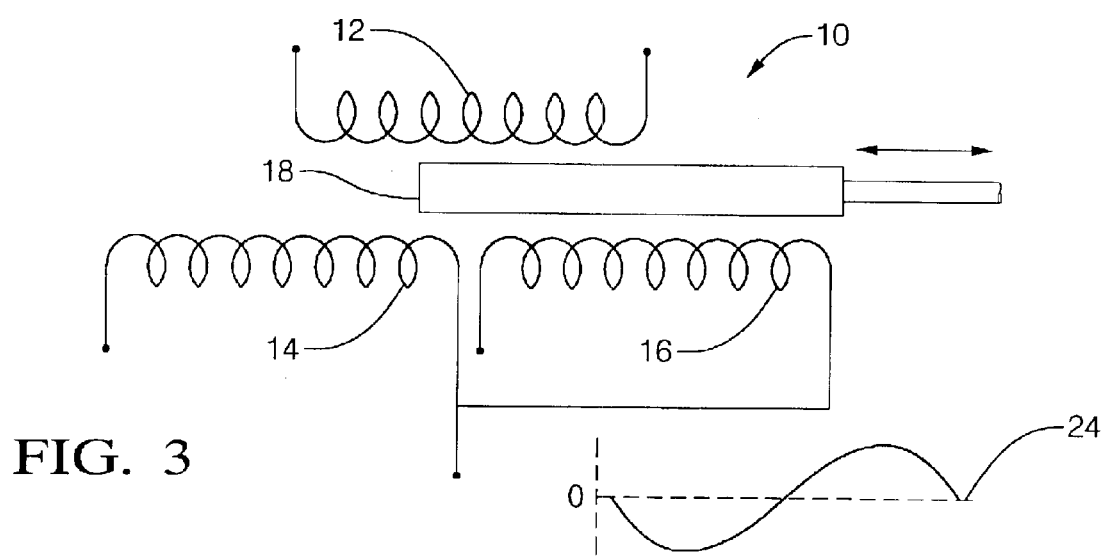
FIG. 3 is a schematic illustration of a linear variable differential transformer (LVDT) of the prior art in a third position or a limit of travel in another direction.
Figure 4:
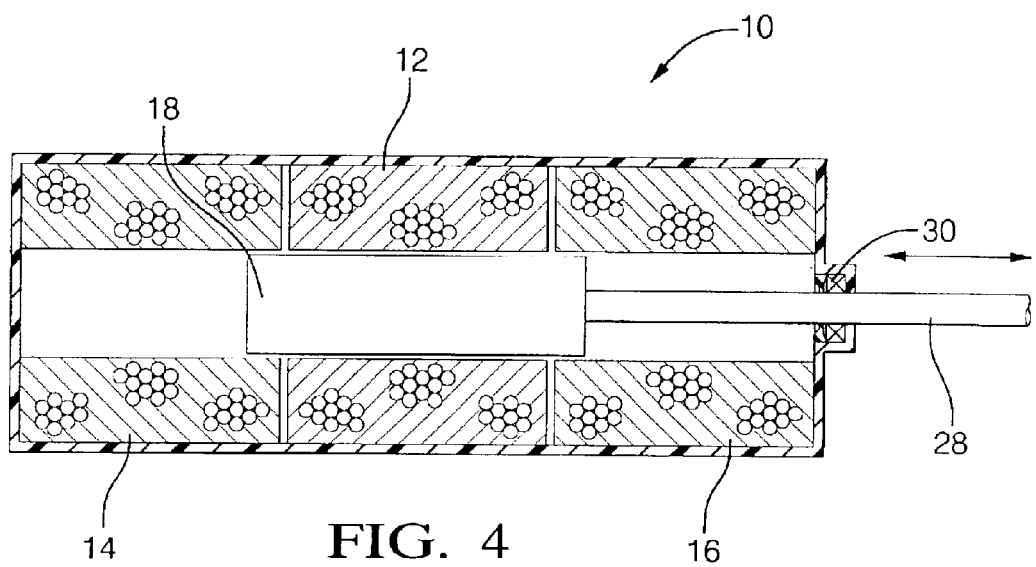
FIG. 4 is a cross-sectional view of a linear variable differential transformer (LVDT) of the prior art.

The two secondary windings are connected to each other in a manner similar to that illustrated schematically in FIG. 3, which results in the two induced voltages to be opposite in phase and thus cancel each other out. This results in a zero output. This is illustrated schematically in graph 56.

It is, of course, noted that the configuration of movable magnet 44, core 42, primary winding 36 and the secondary windings 38 and 40 are provided such that the centering of the movable magnet saturates the portion of the core disposed within primary winding 36 while the induced voltages in the unsaturated portions of the core disposed within the two secondary windings are equal in amplitude but in opposite phase.

Figure 6:
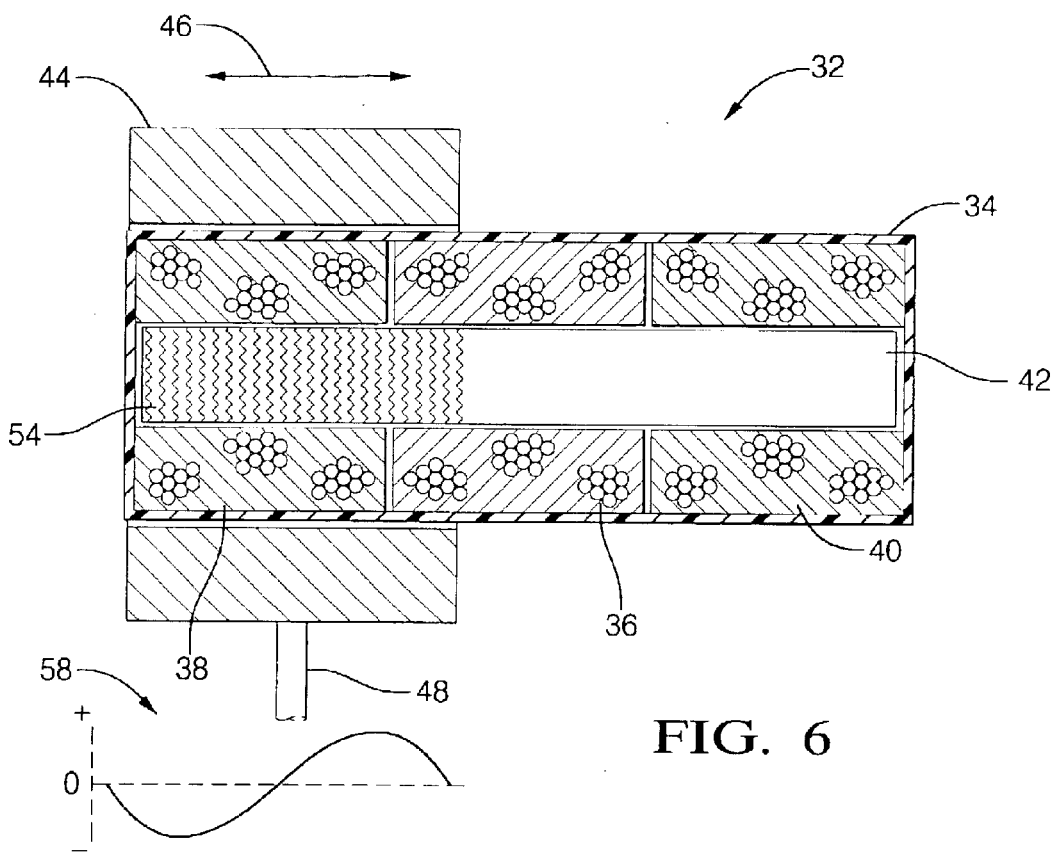
FIG. 6 is a cross-sectional view of a magnetically variable differential transformer (MVDT) of the present disclosure in a second position or a limit of travel in one direction.

Referring now to FIG. 6, which illustrates the movable magnet of MVDT 32 at a maximum point of travel in one direction or left as illustrated in the figure. At this position the induced voltage in the second secondary winding reaches a maximum with a phase illustrated in graph 58. This is because the position of the magnet couples more magnetic flux 60 into the portion of the non-movable core disposed with first secondary winding 38 and very little or no flux into the portion of the non-movable core disposed within second secondary winding 40. Therefore, the portion of the core disposed within first secondary winding 38 becomes magnetically saturated. The difference in the induced voltages between first secondary winding 38 and second secondary winding 40 with the movable magnet at this position results in a maximum amplitude and phase of the voltages induced in the second secondary winding (e.g., the non-magnetically saturated portion of the core) which is illustrated by graph 58. It is also noted that the signal illustrated by graph 58 is out of phase with the excitation. Note this graph 58 has a phase similar to the phase to graph 24 (FIG. 3) wherein a movable core is used.

Of course, positions between of the movable magnet between the center of travel illustrated in FIG. 5 and the maximum illustrated in FIG. 6 will result in induced voltages having a lower amplitude but similar phase.

Figure 7:
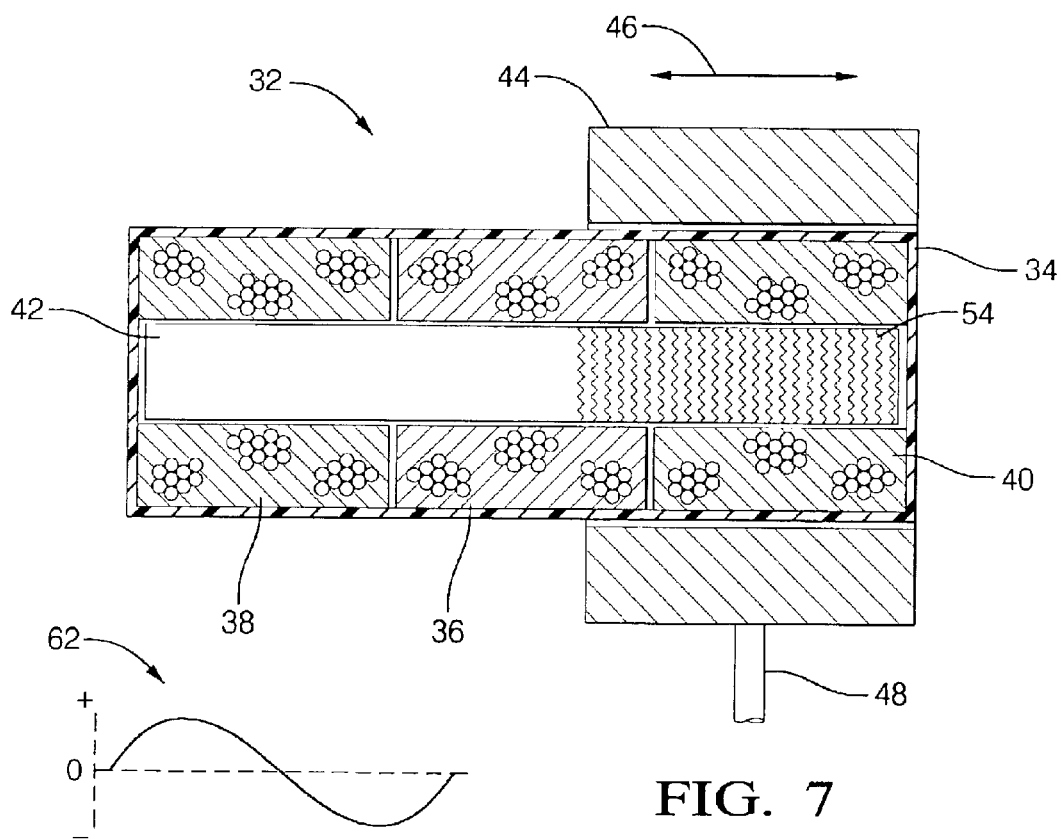
FIG. 7 is a cross-sectional view of a magnetically variable differential transformer (MVDT) of the present disclosure in a third position or a limit of travel in another direction.

As the movable magnet is moved to the position illustrated in FIG. 7, which illustrates the movable magnet of MVDT 32 at a maximum point of travel in another direction or right as illustrated in the figure. At this position the induced voltage reaches a maximum with a phase illustrated in graph 62. The phase in graph 62 is 180 degrees opposite to the phase of graph 58.

Figure 1:
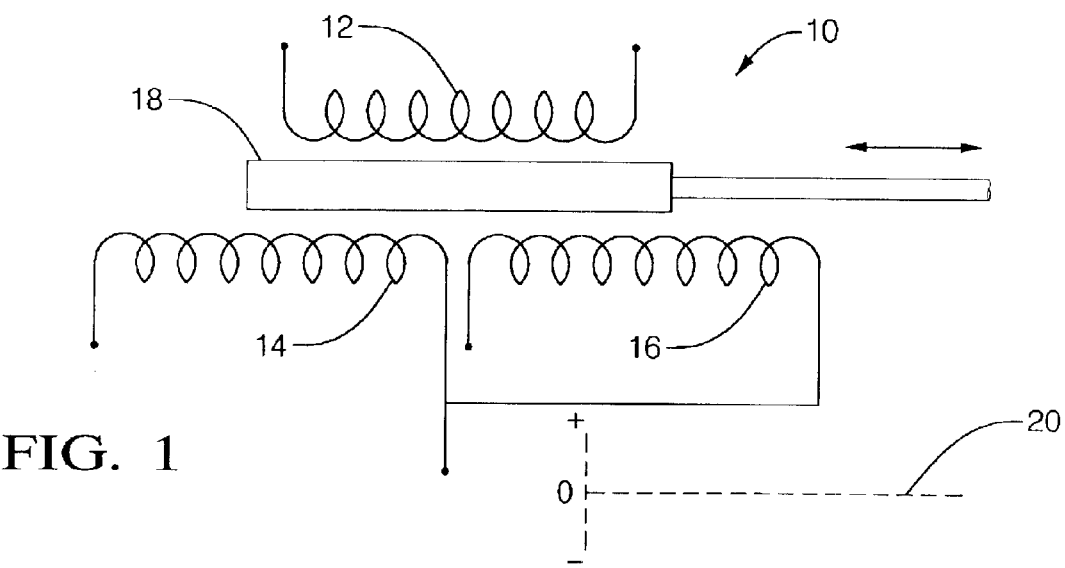
FIG. 1 is a schematic illustration of a linear variable differential transformer (LVDT) of the prior art in a first position or center of travel.
Figure 2:
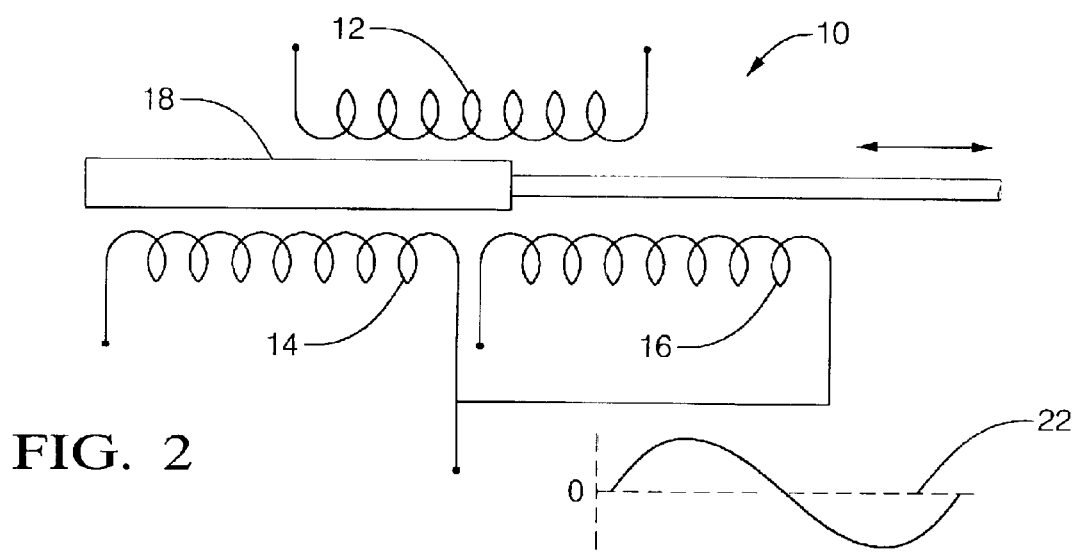
FIG. 2 is a schematic illustration of a linear variable differential transformer (LVDT) of the prior art in a second position or a limit of travel in one direction.

Here more magnetic flux 64 is coupled into the portion of the non-movable core disposed within second secondary winding 40 and very little into portion of the core disposed within first secondary winding 38. Therefore, the portion of the core disposed within second secondary winding 40 becomes magnetically saturated. The difference in the induced voltages between first secondary winding 38 and second secondary winding 40 with the movable magnet at this position results in a maximum amplitude and phase of the voltages induced in the first secondary winding (e.g., the non-magnetically saturated portion of the core) which is illustrated by graph 62. It is also noted that the signal illustrated by graph 62 has a phase similar to the phase of graph 22 (FIG. 2) wherein a movable core is used.

Accordingly, and by using known technologies to measure the output or induced voltage of the MVDT, the position of a body or movement of a body is determined by coupling the body to the movable magnet. Thus, wherein a very accurate high resolution sensor is provided that utilizes much less length (approximately ½) of a LVDT to measure the movement of the same item. In addition, the entire structure is capable of being sealed thereby making it moisture proof.

The MVDT of the present disclosure operates similar to a LVDT, the device comprises a primary and two secondary windings however, the core now extends along the entire length of the sensor and is not movable. The non-movable core, which comprises a high permeable material (as compared to air), such as ferrite or equivalents thereof, transmits large amounts of magnetic flux to the secondary coils from the primary excitation coil and the movable magnet is used to saturate relevant portions of the non-movable permeable core effectively nullifying its capability to transfer magnetic flux.

The stationary core material exhibits high permeability until the maximum flux density for the core material is reached and wherein the permeability drops to about 1 or that of air when flux saturation occurs. In accordance with an exemplary embodiment of the present disclosure, the movable permanent magnet provides the extra flux required to saturate the core material. Thus, movement of the magnet saturates relevant portions of the core while the other unsaturated portions allow higher induced voltages to be generated in the secondary windings disposed about the unsaturated portions of the core.

It is noted that the particular configuration of the windings (primary and secondaries), the movable magnet and the core material are such that when the movable magnet is in center position illustrated in FIG. 5, the induced voltages (in the secondary windings) are symmetrical in amplitude but in opposite phase. In addition, the secondary windings are connected in such a manner that when the movable magnet is in the center position illustrated in FIG. 5, the symmetrically induced voltages are opposite in phase and thus, cancel each other out.

In an exemplary embodiment, the MVDT is used in a displacement sensor assembly wherein the MVDT is configured to provide outputs that correspond to the position of an item being sensed by the displacement sensor assembly.

FIG. 5 shows the displacement sensor at the center of travel where the core material disposed at the center of the assembly is saturated however, symmetry between the windings 38 and 40 is preserved and the voltages in the secondary windings are equal and opposite in phase thus, they cancel each other out and provide a zero output. As the magnet is moved to a limit of travel to the left (FIG. 6) the core material disposed inside first secondary winding 38 is saturated resulting in a low voltage introduced into first secondary winding 38. However, second secondary winding 40 has a fill unsaturated core disposed therebetween as the magnet has been moved to the position in FIG. 6, which results in a large induced voltage in second secondary winding 40. The result is a large amplitude signal of opposite phase with respect to the excitation (graph 58) at the output.

When the magnet is moved to its maximum range illustrated in FIG. 7, which is as far as possible from the position illustrated in FIG. 6, the core material disposed inside second secondary winding 40 is saturated which results in a low voltage outlet from second secondary winding 40 and a large voltage output from first secondary winding 38. This output is now at a maximum amplitude and in phase with the excitation (graph 62)

In addition, since the housing no longer requires a seal for a movable rod connected to the core there is no chance for external contaminants to infiltrate into the sensor and cause permanent damage. For example, water may act as a conductor and salt can cause corrosion in the windings or the wires of the device. The connection to the movable body to be measured can be connected to the sensor at a right angle to the axis of the sensor, which makes for a sensor of minimum length. This method of connection will also eliminate hysterisis problems which are a by product of an O-ring sealing means used in the actuation to movable core connection illustrated in FIGS. 1–4, such hysterisis is caused by wear in the O-ring or sealing means which will provide variable resistance between the rod and the O-ring as it moves therein.

Figure 8:
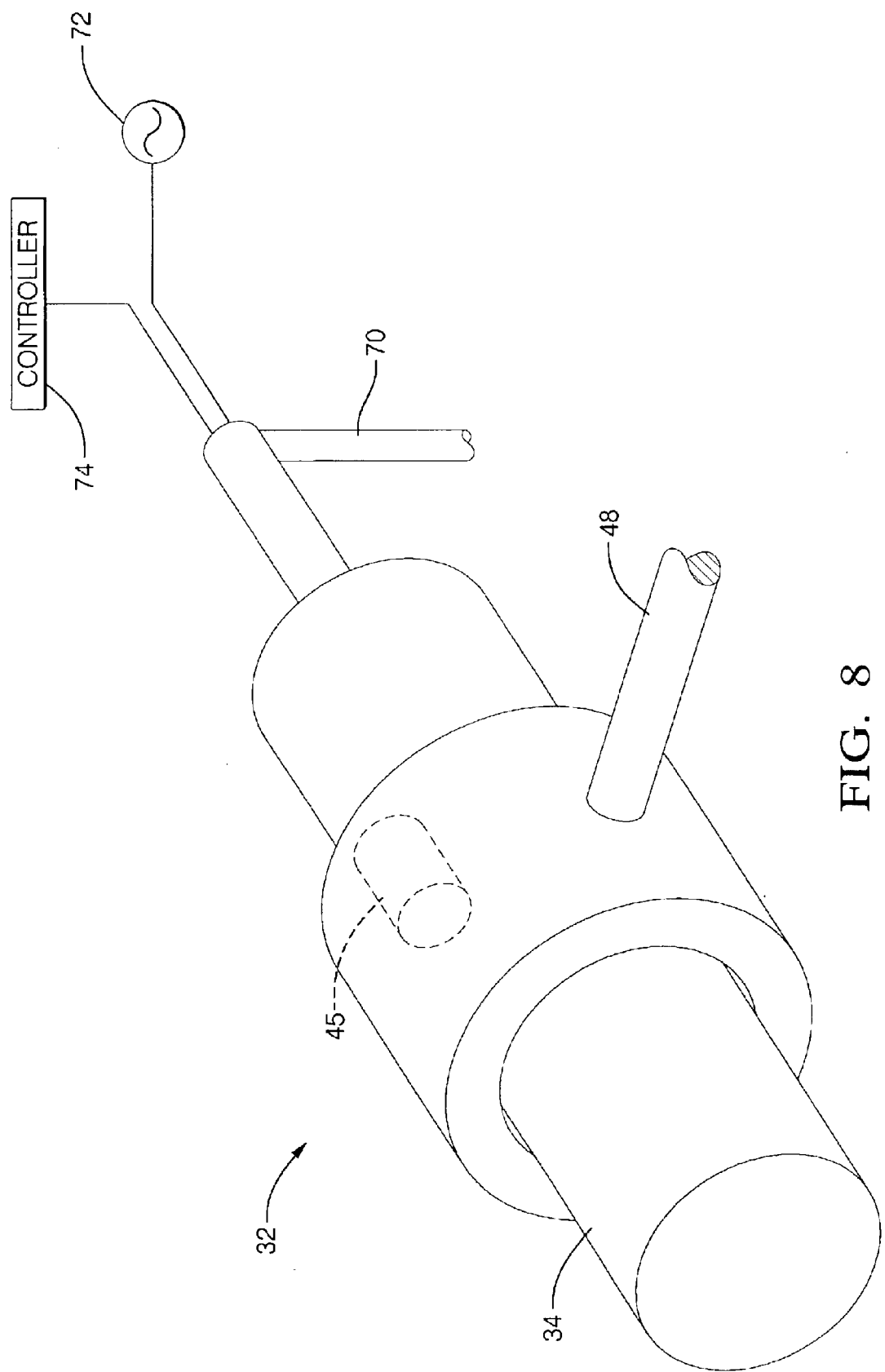
FIG. 8 is a perspective view of a sensor assembly a magnetically variable differential transformer (MVDT) of the present disclosure.

Referring now to FIG. 8, a perspective view of a possible MVDT assembly is illustrated. Here movable magnet 36 is a ring plastic having at least two magnets 45 encased therein. The movable magnet is secured to the body whose movement is to be tracked and housing 34 is supported at one end by a structure 70 that allows the movable magnet to be in a non-contact relationship with respect to the housing. Of course, other means for supporting housing 34 within movable magnet 36 are contemplated to be within the scope of the present disclosure.

Also, structure 70 may provide a means for connecting the primary to a source of excitation 72 while also providing a means for connecting the outputs of the induced voltages of the secondary windings to a controller 74 (e.g., wires housed within structure 70). It is of course, noted that the structures are for purposes of providing an example and/or illustration and the present disclosure is not intended to be limited to the specific embodiments disclosed therein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present disclosure not be limited to the particular embodiment disclosed as the best mode contemplated for carrying out this invention, but that the invention will include all embodiments falling within the scope of the appended claims. Furthermore, no element, component, or method step in the present disclosure is intended to be dedicated to the public regardless of whether the element, component, or method step is explicitly recited in the claims.

What is claimed is:

1. A magnetically variable differential transformer, comprising:
   a primary winding;
   a first secondary winding;
   a second secondary winding;
   a non-movable permeable core disposed within said primary winding, said first secondary winding and said second secondary winding; and
   a movable magnet configured for movement about said primary winding, said first secondary winding and said second secondary winding, wherein movement of said movable magnet causes magnetic saturation of portions of said non-movable permeable core.

2. The magnetically variable differential transformer as in claim 1, wherein said movable magnet is a pair of magnets encased in a ring of plastic having an inner opening configured to allow said primary winding, said first secondary winding and said second secondary winding to pass therethrough in a non-contacting manner.

3. The magnetically variable differential transformer as in claim 1, wherein said first secondary winding and said second secondary winding are connected to each other and have induced voltages which cancel each other out when said movable magnet is in a center position with respect to said non-movable permeable core and said primary winding is connected to a source of excitation.

4. The magnetically variable differential transformer as in claim 1, wherein said primary winding, said first secondary winding, said second secondary winding and said non-movable permeable core are sealed within a non-magnetic housing and said movable magnet is configured to move about said non-magnetic housing in a non-contacting manner.

5. The magnetically variable differential transformer as in claim 1, wherein said movable magnet is secured to a connecting member adapted to translate movement to said movable magnet.

6. The magnetically variable differential transformer as in claim 5, wherein said connecting member depends away from said movable magnet in a direction that is not parallel to the direction of movement of said movable magnet.

7. The magnetically variable differential transformer as in claim 5, wherein said connecting member depends away from said movable magnet in a direction that is orthogonal to the direction of movement of said movable magnet.

8. The magnetically variable differential transformer as in claim 1, wherein said non-movable permeable core is a ferrite material.

9. A magnetically variable differential transformer, comprising:
   a primary winding disposed on a center portion of a bobbin having a central opening, said bobbin being formed out of a non-magnetic material;
   a first secondary winding disposed on one side of said bobbin adjacent to said primary winding;
   a second secondary winding disposed on another side of said bobbin adjacent to said primary winding;
   a non-movable permeable core being disposed in said central opening and being disposed within said first secondary winding, said primary winding and said second secondary winding; and
   a movable magnet disposed about said primary winding, said first secondary winding and said second secondary winding, wherein movement of said movable magnet causes magnetic saturation of portions of said non-movable permeable core.

10. The magnetically variable differential transformer as in claim 9, wherein said non-movable permeable core is a ferrite material.

11. The magnetically variable differential transformer as in claim 9, wherein said first secondary winding and said second secondary winding are connected to each other and have induced voltages which cancel each other out when said movable magnet is in a center position with respect to said non-movable permeable core and said primary winding is connected to a source of excitation.

12. The magnetically variable differential transformer as in claim 11, wherein said primary winding, said first secondary winding, said second secondary winding and said non-movable permeable core are sealed within a non-magnetic housing and said movable magnet is configured to move about said non-magnetic housing in a non-contacting manner.

13. The magnetically variable differential transformer as in claim 12, wherein said movable magnet is secured to a connecting member adapted to translate movement to said movable magnet.

14. The magnetically variable differential transformer as in claim 12, wherein said movable magnet is a pair of magnets encased in a ring of having an inner opening configured to allow said primary winding, said first secondary winding and said second secondary winding to pass therethrough in a non-contacting manner.

15. A magnetically variable differential transformer, comprising:
   a primary winding disposed about a center portion of a non-movable permeable core;
   a first secondary winding disposed on one side of said primary winding and being disposed about a first portion of said non-movable permeable core;
   a second secondary winding disposed on another side of said primary winding and being disposed about a second portion of said non-movable permeable core; and
   a movable magnet being configured to magnetically saturate one of said first portion, said second portion or said center portion of said non-movable permeable core as said movable magnet moves with respect to said non-movable permeable core.

16. The magnetically variable differential transformer as in claim 15, wherein said movable magnet is a pair of magnets encased in a ring of plastic having an inner opening configured to allow said primary winding, said first secondary winding and said second secondary winding to pass therethrough in a non-contacting manner.

17. The magnetically variable differential transformer as in claim 15, wherein said first secondary winding and said second secondary winding are connected to each other and have induced voltages which cancel each other out when said center section of said non-movable permeable core is saturated by said movable magnet and said primary winding is connected to a source of excitation.

18. The magnetically variable differential transformer as in claim 15, wherein said primary winding, said first secondary winding, said second secondary winding and said non-movable permeable core are sealed within a non-magnetic housing and said movable magnet is configured to move about said non-magnetic housing in a non-contacting manner.

19. The magnetically variable differential transformer as in claim 18, wherein said movable magnet is secured to a connecting member adapted to translate movement to said movable magnet.

20. The magnetically variable differential transformer as in claim 19, wherein said connecting member depends away from said movable magnet in a direction that is not parallel to the direction of movement of said movable magnet.

21. The magnetically variable differential transformer as in claim 20, wherein said connecting member depends away from said movable magnet in a direction that is orthogonal to the direction of movement of said movable magnet.

22. A method for tracking the movement of a movable object with a variable differential transformer, comprising:
   providing an excitation to a primary winding disposed between a first secondary winding and a second secondary winding, said primary winding, said first secondary winding and said second secondary winding are each disposed about a non-moveable permeable core, wherein said first secondary winding and said second secondary winding are connected to each other and provide an output corresponding to voltages induced within said first secondary winding and said second secondary winding by said primary winding; and
   coupling a movable magnet to the movable object wherein said movable magnet saturates portions of said non-moveable permeable core thereby modifying the output corresponding to voltages induced within said first secondary winding and said second secondary winding by said primary winding.

23. The method as in claim 22, wherein said movable magnet is coupled to the movable object by a connecting member that depends away from said movable magnet in a direction that is not parallel to the direction of movement of said movable magnet.

24. The method as in claim 23, wherein said connecting member depends away from said movable magnet in a direction that is orthogonal to the direction of movement of said movable magnet.

25. The method as in claim 22, wherein said primary winding, said first secondary winding, said second secondary winding and said non-moveable permeable core are sealed within a non-magnetic housing and said movable magnet is configured to about said non-magnetic housing in a non-contacting manner.

* * * * *